United States Patent [19]

Berta

[11] Patent Number: 5,552,482
[45] Date of Patent: Sep. 3, 1996

[54] THERMOPLASTIC ELASTOMERS WITH IMPROVED EXTRUSION PERFORMANCE

[75] Inventor: Dominic A. Berta, Newark, Del.

[73] Assignee: Montell North America Inc., Wilmington, Del.

[21] Appl. No.: 525,049

[22] Filed: Sep. 8, 1995

[51] Int. Cl.$^6$ .............. C08L 23/26; C08L 53/00
[52] U.S. Cl. .............. 525/88; 525/89; 525/86; 525/71; 525/193; 525/194; 525/240
[58] Field of Search ............... 525/88, 89, 193, 525/240

[56] References Cited

U.S. PATENT DOCUMENTS

| | | | |
|---|---|---|---|
| 4,113,804 | 9/1978 | Cotten et al. | 525/211 |
| 4,247,652 | 1/1981 | Matsuda et al. | 525/240 |
| 4,948,840 | 8/1990 | Berta | 525/193 |
| 5,143,978 | 9/1992 | Berta | 525/240 |
| 5,196,462 | 3/1993 | Berta | 524/94 |
| 5,212,246 | 5/1993 | Ogale | 525/240 |
| 5,338,801 | 8/1994 | Eppert | 525/88 |
| 5,360,868 | 11/1994 | Mosier et al. | 525/89 |

*Primary Examiner*—Carman J. Seccuro, Jr.

[57] ABSTRACT

A partially dynamically vulcanized or crosslinked thermoplastic polyolefin elastomer/uncrosslinked olefin polymer blend has improved extrusion performance. The uncrosslinked olefin polymer is selected from (1) a heterophasic olefin composition prepared by polymerization in at least two stages comprising (a) 10% to 50% by weight of a propylene homopolymer or a propylene copolymer, (b) 5% to 20% by weight of a semicrystalline, essentially linear ethylene copolymer fraction, and (c) 40% to 80% by weight of an ethylene copolymer fraction that is soluble in xylene at ambient temperature, (2) crystalline butene-1 homopolymer, and (3) a substantially amorphous ethylene/propylene or ethylene/butylene copolymer; or a substantially amorphous terpolymer of (a) ethylene, (b) propylene or butylene, and (c) a nonconjugated diene.

9 Claims, No Drawings

5,552,482

THERMOPLASTIC ELASTOMERS WITH IMPROVED EXTRUSION PERFORMANCE

FIELD OF THE INVENTION

This invention relates to a blend of a partially crosslinked thermoplastic polyolefin elastomer and an uncrosslinked olefin polymer.

BACKGROUND OF THE INVENTION

The preparation of dynamically partially crosslinked thermoplastic elastomers from (i) a propylene polymer material, (ii) an amorphous ethylene/propylene copolymer rubber, and (iii) a semicrystalline, essentially linear ethylene copolymer is described in U.S. Pat. Nos. 4,948,840; 5,143,978, and 5,196,462. A fourth component, polybutene-1, is included in the composition of U.S. Pat. No. 5,143,978 and is optional in U.S. Pat. No. 5,196,462.

Olefinic thermoplastic elastomers have been used in various extrusion applications such as films, sheet, wire coating, profile extrusions, and other shaped articles. In many cases material builds up on the die face during extrusion. This is undesirable, since the material that has built up can come loose and stick to the article being extruded or formed. The unwanted material is not easily removed and causes disruptions in the usually continuous process. If it is not removed, it causes disruption in the collection of the article being extruded, since the article is usually collected on a roll. In some cases, if the stuck piece is not removed, it can lead to premature failure of the article during service. Thus, there is a need to minimize or prevent buildup of any material on the die face during extrusion of thermoplastic elastomers without significantly affecting the properties or performance of the material or extruded article.

SUMMARY OF THE INVENTION

The composition of this invention comprises a blend of
(A) about 97.5% to about 85% by weight, based on the total weight of the blend, of a dynamically partially crosslinked thermoplastic elastomer prepared from a composition comprising
  (1) about 30% to about 70% of a crystalline propylene homopolymer having an isotactic index greater than 90%, or a crystalline propylene copolymer with ethylene or a 4–8 carbon alpha-olefin having a propylene content greater than 85% and an isotactic index greater than 85%;
  (2) about 30% to about 60% of an amorphous rubber fraction comprising an ethylene/propylene or ethylene/butylene copolymer and, optionally, about 1% to about 10% of a diene, based on the total weight of ethylene/propylene or ethylene/butylene copolymer, wherein the rubber is xylene soluble at room temperature and contains about 30% to about 70% ethylene, and about 70% to about 30% propylene or butylene, based on the total weight of ethylene/propylene or ethylene/butylene copolymer;
  (3) about 3% to about 30% of a semicrystalline ethylene/propylene or ethylene/butylene copolymer that is xylene insoluble at room temperature and contains greater than 90% ethylene, all percentages being by weight, based on the total weight of (1)+(2)+(3), and
  (4) 0 to about 20 parts, based on 100 parts of (1)+(2)+(3), of a crystalline butene-1 homopolymer, wherein the ratio of polybutene-1 to rubber is less than 0.5, and (B) about 2.5% to about 15% by weight, based on the total weight of the blend, of an uncrosslinked olefin polymer material selected from the group consisting of
  (1) a heterophasic olefin polymer composition prepared by polymerization in at least two stages comprising
    (a) about 10% to about 50% of a propylene homopolymer having an isotactic index greater than 80, or a propylene copolymer selected from the group consisting of (i) propylene and ethylene, (ii) propylene, ethylene, and a $CH_2$=CHR alpha-olefin, where R is a 2–8 carbon straight or branched alkyl, and (iii) propylene and an alpha-olefin as defined in (ii), the copolymer containing over 80% propylene and having an isotactic index greater than 80,
    (b) about 5% to about 20% of a semicrystalline, essentially linear ethylene copolymer fraction having a crystallinity of about 20% to about 60%, wherein the copolymer is selected from the group consisting of (i) ethylene and propylene containing over 55% ethylene, (ii) ethylene, propylene, and an alpha-olefin as defined in (a)(ii) containing about 1% to about 10% of the alpha-olefin and over 55% of both ethylene and alpha-olefin, and (iii) ethylene and an alpha-olefin as defined in (a) (ii) containing over 55% of the alpha-olefin, which copolymer is insoluble in xylene at room or ambient temperature, and
    (c) about 40% to about 80% of an ethylene copolymer fraction wherein the copolymer is selected from the group consisting of (i) ethylene and propylene containing from 20% to less than 40% ethylene, (ii) ethylene, propylene, and an alpha-olefin as defined in (a)(ii), wherein the alpha-olefin is present in an amount of about 1% to about 10% and the amount of ethylene and alpha-olefin present is from 20% to less than 40%, and (iii) ethylene and an alpha-olefin as defined in (a)(ii) containing from 20% to less than 40% of the alpha-olefin, and optionally about 0.5% to about 10% of a diene, the copolymer fraction being soluble in xylene at ambient temperature, and having an intrinsic viscosity of about 1.5 to about 4.0 dl/g, the total of the (b) and (c) fractions, based on the total heterophasic olefin polymer composition, being about 50% to about 90%, and the weight ratio of (b)/(c) being less than 0.4, wherein the composition has a flexural modulus of less than 150 MPa,
  (2) a crystalline butene-1 homopolymer, and
  (3) a substantially amorphous ethylene/propylene or ethylene/butylene copolymer having an ethylene content of about 70% to about 80% and a propylene or butylene content of about 30% to about 20%; or a substantially amorphous terpolymer of (a) ethylene, (b) propylene or butylene, and (c) a nonconjugated diene, the ethylene content being about 70% to about 80%, the propylene or butylene content being about 30% to about 20%, and the diene content being about 1% to about 10%, based on the total weight of ethylene plus propylene or butylene. The blend has improved extrusion performance compared with the partially crosslinked thermoplastic elastomer alone, in that it significantly reduces or eliminates the buildup of material on the face of the die during extrusion, and, surprisingly, with no substantial change in the elastomeric properties of the thermoplastic elastomer as measured by compression set.

DETAILED DESCRIPTION OF THE INVENTION

Component (A) used in the blend of this invention is a dynamically partially crosslinked thermoplastic elastomer prepared from a composition comprising (1) about 30% to about 70%, preferably about 20% to about 50%, of a crystalline propylene homopolymer having an isotactic index greater than 90%, preferably greater than 98%, or a crystalline propylene copolymer with ethylene or a 4–8 carbon alpha-olefin having a propylene content greater than 85% and an isotactic index greater than 85%;

(2) about 30% to about 60%, preferably about 30% to about 50%, of an amorphous rubber fraction comprising an ethylene/propylene or ethylene/butylene copolymer and, optionally, about 1% to about 10%, preferably about 1% to about 5% of a diene, based on the total weight of ethylene/propylene or ethylene/butylene copolymer, wherein the rubber is xylene soluble at room temperature and contains about 30% to about 70% ethylene, and about 70% to about 30% propylene or butylene, based on the total weight of ethylene/propylene or ethylene/butylene copolymer;

(3) about 3% to about 30%, preferably about 8% to about 20%, of a semicrystalline ethylene/propylene or ethylene/butylene copolymer that is xylene insoluble at room temperature and contains greater than 90% ethylene, preferably greater than 95%, all percentages being by weight based on the total weight of (1)+(2)+(3), and (4) 0 to about 20 parts, based on 100 parts of(1)+(2)+(3), of a crystalline butene-1 homopolymer, wherein the ratio of polybutene-1 to rubber is less than 0.5.

The diene, when present in (A)(2), can be, for example, 1,4-hexadiene, ethylidene norbornene, or dicyclopentadiene.

When present, component (4) is preferably a crystalline isotactic polybutene-1 having a density of about 0.914 to about 0.919 g/cm$^3$, with a melt index of about 1 to about 100 dg/min. The polybutene-1 is present in an amount of about 2 to about 20 parts, preferably about 4 to about 15 parts, based on 100 parts of(1)+(2)+(3). The ratio of the polybutene-1 to component (2) must be less than 0.5, preferably about 0.1 to about 0.3.

Component (A) is present in an amount of about 97.5% to about 85% of the total weight of the blend, preferably about 95% to about 90%.

Preferably, components (1), (2), and (3) are formed in a reactor or series of reactors in at least two stages by first polymerizing propylene to form component (1) and then polymerizing ethylene and propylene, or ethylene and butylene, in the presence of component (1) and the catalyst used in the first stage, to form components (2) and (3). The polymerization can be conducted in liquid or gas phase or in liquid-gas phase. In the alternative, components (1), (2), and (3) can each be prepared separately and then mixed by melt-kneading.

The composition from which the thermoplastic elastomer is prepared (components (A)(1)+(2)+(3)+(4), if present) preferably has a flexural modulus of greater than 200 MPa and less than 700 MPa, preferably greater than 200 MPa and less than 500 MPa, before dynamic partial crosslinking. Optionally, additional rubber (A)(2) in an amount up to about 60%, preferably about 5% to about 50%, based on the total weight of (A), can be mechanically blended with the composition before dynamic partial crosslinking.

Preparation of the dynamically partially crosslinked thermoplastic elastomer (A) is disclosed in more detail in U.S. Pat. Nos. 4,948,840; 5,143,978 and 5,196,642, the methods of preparation of which are incorporated herein by reference.

The thermoplastic elastomer (A) of the present invention is dynamically partially crosslinked using a peroxide curing system comprising an organic peroxide and at least one crosslinking aid selected from 1,2-polybutadiene and certain furan derivatives. The peroxide curing system is added to a mixture of components (1), (2), (3), and optionally, (4), and the mixture is subjected to curing conditions while masticating the mixture to bring about the desired dynamic partial cure.

The term "partially cured" means that the degree of curing, in terms of the gel content, is at least 80% and no more than 94% in cyclohexane. Preferably, the gel content is about 85% to about 92%.

The peroxide curing system of the partially crosslinked thermoplastic elastomer can further contain other coagents, such as phenylene-bis-maleimide and/or sulfur donors, such as benzothiazyl disulfide, tetramethylthiuram monosulfide, alkylphenol disulfide and N, N'-diethylthiourea. The amount of the other coagent used is about 0.5 to about 3 parts, preferably about 1 to about 2.5 parts, and the amount of sulfur donor is about 0.15 to about 3, preferably about 0.17 to about 2 parts, based on 100 parts of (A).

When the peroxide curing system contains an additional coagent and/or sulfur donor, the coagent is generally added along with the 1,2-polybutadiene and the sulfur donor is generally added along with the peroxide.

In addition to the above major components, an antioxidant is generally present in an amount of about 0.1 to about 0.9 parts, based on 100 parts of(A). Suitable examples of antioxidants used in this invention are thiophenols, such as 4,4'-thio-bis-(6-tert-butyl-m-cresol); phosphites, such as trisnonylphenyl phosphite; phenolic esters, such as tetrakis [methylene(3,5-di-tert-butyl-4-hydroxyhydrocinnamate)] methane; thiodipropionates, such as dilaurylthiopropionate; hydroquinones, such as 2,5-di-tert-butylhydroquinones; and quinolines, such as 2,2,4-trimethyl-1,2-dihydroquinone.

A zinc salt of a mercapto compound such as, for example, zinc 2-mercaptobenzothiazole, zinc 2-mercaptobenzimidazole, or zinc 2-mercaptotoluimidazole can also be present as a stabilizer in an amount of about 0.8 to about 5 parts, based on 100 parts of (A).

The thermoplastic elastomer can also contain other conventional additives, for example, flame retardants; extender oils, such as paraffinic and naphthenic oils, in an amount of about 20 to about 100 parts, preferably about 25 to about 60 parts, and most preferably about 25 to about 50 parts, based on 100 parts of amorphous olefin copolymer rubber (A)(2); or zinc oxide, CaCO$_3$, talc, or other fillers in an amount of about 2 to about 20 parts, based on 100 parts of (A).

When the partially crosslinked thermoplastic elastomer is prepared by the premixed method, the extender oil is generally added after the premix is charged to the mixer and fluxing of the ingredients has begun.

After at least 90–95% of the peroxide used to partially crosslink the thermoplastic elastomer has reacted, the partially crosslinked thermoplastic elastomer (A) is mixed with the uncrosslinked olefin polymer material (B). Since the crosslinker is essentially depleted before (A) and (B) are mixed, no further crosslinking takes place. If (B) is mixed with (A) before the peroxide has substantially completely reacted, the desired improvement in extrusion performance is not observed.

Component (B) used in the blend of this invention is an uncrosslinked olefin polymer material selected from the group consisting of (1) a heterophasic olefin polymer composition prepared by polymerization in at least two stages comprising
   (a) about 10% to about 50% of a propylene homopolymer having an isotactic index greater than 80, or a propylene copolymer selected from the group consisting of (i) propylene and ethylene, (ii) propylene, ethylene and a $CH_2=CHR$ alpha-olefin, where R is a 2-8 carbon straight or branched alkyl, and (iii) propylene and an alpha-olefin as defined in (ii), the copolymer containing over 80% propylene and having an isotactic index greater than 80,
   (b) about 5% to about 20% of a semicrystalline, essentially linear ethylene copolymer fraction having a crystallinity of about 20% to about 60%, wherein the copolymer is selected from the group consisting of (i) ethylene and propylene containing over 55% ethylene, (ii) ethylene, propylene, and an alpha-olefin as defined in (a)(ii) containing about 1% to about 10% of the alpha-olefin and over 55% of both ethylene and alpha-olefin, and (iii) ethylene and an alpha-olefin as defined in (a) (ii) containing over 55% of the alpha-olefin, which copolymer is insoluble in xylene at room or ambient temperature, and
   (c) about 40% to about 80% of an ethylene copolymer fraction wherein the copolymer is selected from the group consisting of (i) ethylene and propylene containing from 20% to less than 40% ethylene, (ii) ethylene, propylene, and an alpha-olefin as defined in (a)(ii), wherein the alpha-olefin is present in an amount of about 1% to about 10% and the amount of ethylene and alpha-olefin present is from 20% to less than 40%, and (iii) ethylene and an alpha-olefin as defined in (a)(ii) containing from 20% to less than 40% of said alpha-olefin, and optionally about 0.5% to about 10% of a diene, the copolymer fraction being soluble in xylene at ambient temperature, and having an intrinsic viscosity of about 1.5 to about 4.0 dl/g, the total of the (b) and (c) fractions, based on the total heterophasic olefin polymer composition, being about 50% to about 90%, and the weight ratio of (b)/(c) being less than 0.4, wherein the composition has a flexural modulus of less than 150 MPa, (2) a crystalline butene-1 homopolymer, and (3) a substantially amorphous ethylene/propylene or ethylene/butylene copolymer having an ethylene content of about 70% to about 80%, preferably about 70% to about 75%, and a propylene or butylene content of about 30% to about 20%, preferably about 30% to about 25%; or a substantially amorphous terpolymer of (a) ethylene, (b) propylene or butylene, and (c) a nonconjugated diene, the ethylene content being about 70% to about 80%, preferably about 70% to about 75%, the propylene or butylene content being about 30% to about 20%, preferably about 30% to about 25%, and the diene content being about 1% to about 10%, based on the total weight of ethylene plus propylene or butylene.

Component (B) is present in an amount of about 2.5% to about 15%, preferably about 5% to about 10%, based on the total weight of the blend. The heterophasic olefin polymer composition (B)(1) is the preferred component (B).

The term "substantially amorphous" means that the copolymer has a small amount of crystallinity, i.e., about 1% to about 12%, preferably about 2% to about 10%, as measured with a differential scanning calorimeter.

The heterophasic olefin polymer composition (B)(1) can be prepared using a polymerization process comprising at least two stages, where in the first stage (a) the propylene, (b) propylene and ethylene, or (c) propylene, ethylene, and the alpha-olefin are polymerized to form component (B)(1)(a), and in the following stages the mixtures of ethylene and propylene; ethylene and the alpha-olefin; or ethylene, propylene and the alpha-olefin, and optionally, a diene, are polymerized to form components (B)(1)(b) and (B)(1)(c).

The polymerization can be conducted in liquid phase, gas phase, or liquid-gas phase using separate reactors, all of which can be done either by batch or continuously. For example, it is possible to carry out the polymerization of component (a) using liquid propylene as a diluent, and the polymerization of components (b) and (c) in gas phase, without intermediate stages except for the partial degassing of the propylene. This is the preferred method. The preparation of the heterophasic olefin composition is described in more detail in U.S. Pat. No. 5,212,246, the preparation of which is incorporated herein by reference.

The 4-8 carbon alpha-olefins used in the preparation of component (B)(1) described above, include, for example, butene-1, pentene-1, 4-methylpentene-1, octene-1, and hexene-1. When used to prepare component (B)(1), they are present in such quantities that the isotactic index of the resulting polymer is not less than 80%.

The diene, when present in component (B)(1)(c) or (B)(3)(b) is typically a butadiene, 1,4-hexadiene, 1,5-hexadiene, or ethylidene norbornene.

The crystalline butene-1 homopolymer (B)(2) is preferably a crystalline isotactic polybutene-1 having a density of about 0.914 to about 0.919 g/cm$^3$, and a melt index of about 1 to about 100 dg/min.

The blending of components (A) and (B) can be carried out by any of the following three methods. In Method A, all of the ingredients of the partially crosslinked thermoplastic elastomer (A) are combined according to the method described in U.S. Pat. No. 5,143,978 in an internal mixer, for example, and the uncrosslinked olefin polymer (B) is added to the mixing chamber after at least 90% to 95% of the peroxide used to crosslink the thermoplastic elastomer has reacted. Further mixing takes place (about 1 to 2 minutes) until incorporation of the uncrosslinked olefin polymer is complete and the mix reaches a substantially constant viscosity.

In Method B, the partially crosslinked thermoplastic elastomer is prepared according to the method referred to previously. The thermoplastic elastomer is then allowed to solidify or cool to room temperature, usually in pellet form. The pellets of the thermoplastic elastomer (A) are then combined with pellets of the uncrosslinked olefin polymer (B) in a mixing vessel, sealed to prevent loss of material, then tumble blended to thoroughly distribute (B) in (A). Further mixing of the components takes place in the extruder prior to fabrication.

In Method C, (A) and (B), both usually in the form of pellets, are added to a suitable mixing device, such as a Banbury mixer, Haake mixer, twin screw extruder, or single screw extruder, and intimately mixed in the molten state by applying heat or by the heat of friction created during mixing. The blend is then extruded and cut into pellets.

The test samples and properties in the following examples were prepared and measured according to the following methods:

Plaques for testing were prepared by using a compression molding press with a picture frame mold 5×5 inches square and 80 mils in thickness. The sample material, usually in pellet form, was weighed into the mold, heat was applied to the platens in contact with the sample at 281° C. for three minutes, then pressure of about 206 MPa was applied to form the molten material into a plaque. The heat was turned off and the heated platens cooled, usually by circulating water, to solidify the molten material.

Die deposits were measured by extruding material, using a Brabender ¾ inch extruder with a typical polyolefin screw having an L/D of 24:1 and compression ratio of 3:1, through a slit die of 2 inch width and 60 mils thickness for five minutes at 65 RPM and barrel and die temperatures of 204° C. The amount of material deposited on the die face was collected and weighed with an automatic balance.

Physical properties (tensile strength, elongation at break, and 100% modulus) were determined using ASTM D-412, compression set by ASTM D-395, method B, and Shore A hardness by ASTM D-2240.

An R value was calculated and is defined as the ratio of the die deposits collected for the controls and for the examples that contain both components (A) and (B), to the die deposits collected for the composition without component (A), using the same extrusion conditions. It was found that the desired improvement in extrusion performance was not observed unless the R value was less than 0.2. The R value is preferably less than 0.1, and most preferably less than 0.05.

In order to maintain desirable elastomeric properties as measured by compression set at 100° C. for 22 hours, the blends of this invention should preferably exhibit an increase in compression set of less than a 30% compared to the compression set of the thermoplastic elastomer (A) alone.

In this specification, all parts and percentages are by weight unless otherwise noted.

than the claimed amount of component (B) was added. The amounts of each component of the blends, the R values of the die deposits, and the physical properties of the molded plaques are shown in Table 1.

The thermoplastic elastomer component contained 48.4% crystalline propylene homopolymer, 32.23% amorphous ethylene/propylene rubber, 16.14% semicrystalline ethylene/propylene copolymer, and 3.22% polybutylene. The thermoplastic elastomer component was a blend of (a) 25 parts of a reactor blend of 40% propylene homopolymer, 10% of a semicrystalline ethylene/propylene copolymer containing 10% propylene, and 50% of an ethylene/propylene rubber containing 60% ethylene and 40% propylene; and (b) 37.5 parts of a blend of 18 parts of a propylene homopolymer, 10 parts of polybutylene, and 82 parts of an ethylene/propylene rubber containing 54% ethylene and 44% propylene with a Mooney viscosity (ML(1+4)) at 125° C. of 115.

Olefin polymer 1A was a reactor blend of 30% crystalline polypropylene copolymer with 4% ethylene, 5% of a semicrystalline copolymer of ethylene and propylene containing 10% propylene, and 65% of an ethylene/propylene rubber containing 30% ethylene and 70% propylene.

The polybutadiene was Ricon 154D polybutadiene, available from Colorado Chemical Specialties, Inc. having a 90% 1,2-vinyl content, 3200 molecular weight ($M_n$ by gel permeation chromatography), 65% active on Microcel E silicon. The polymeric amylphenol disulfide was Vultac 7 polymeric sulfide, available from Pennwalt Corporation.

The paraffinic oil was Sunpar 2280 paraffinic oil, available from R. F. Carroll, Inc. (Sun Refining & Marketing Co.), having an SUS viscosity at 100° F. of 2640.

TABLE 1

| Ingredients (parts) | Control 1A | Control 2 | Example 1 | Example 2 | Example 3 | Example 4 | Control 3 |
|---|---|---|---|---|---|---|---|
| Thermoplastic elastomer | 62.5 | 62.5 | 62.5 | 62.5 | 62.5 | 62.5 | 62.5 |
| Olefin polymer 1A | — | 5.0[a] | 2.5[b] | 5.0[b] | 10.0[b] | 15.0[b] | 20.0[b] |
| 4,4'-Thio-bis-(6-tert-butyl-m-cresol) | 0.15 | 0.15 | 0.15 | 0.15 | 0.15 | 0.15 | 0.15 |
| Zinc oxide | 1.75 | 1.75 | 1.75 | 1.75 | 1.75 | 1.75 | 1.75 |
| Polybutadiene | 2.00 | 2.00 | 2.00 | 2.00 | 2.00 | 2.00 | 2.00 |
| 1,1'-Bis(tert-butylperoxy)diisopropyl-benzene | 2.10 | 2.10 | 2.10 | 2.10 | 2.10 | 2.10 | 2.10 |
| Polymeric amylphenol disulfide | 0.25 | 0.25 | 0.25 | 0.25 | 0.25 | 0.25 | 0.25 |
| Paraffinic oil | 30.00 | 30.00 | 30.00 | 30.00 | 30.00 | 30.00 | 30.00 |
| Thiodiethylene bis-(3,5-di-tert-butyl-4-hydroxy)hydrocinnamate | 0.175 | 0.175 | 0.175 | 0.175 | 0.175 | 0.175 | 0.175 |
| Zinc-2-mercaptobenzothiazole | 1.25 | 1.25 | 1.25 | 1.25 | 1.25 | 1.25 | 1.25 |
| Mix method | Premix | Premix | A | A | A | A | A |
| Die deposits (g) | 0.0533 | 0.0125 | 0.0027 | 0.0016 | 0.0008 | 0.0004 | 0.0001 |
| R value | 1 | 0.23 | 0.05 | 0.03 | 0.015 | 0.008 | 0.002 |
| 100% Modulus (psi) | 349 | 349 | 335 | 367 | 372 | 395 | 422 |
| Tensile strength (psi) | 688 | 759 | 792 | 870 | 926 | 987 | 1150 |
| Elongation (%) | 360 | 454 | 461 | 468 | 476 | 484 | 513 |
| Shore A hardness | 62 | 62 | 60 | 61 | 62 | 63 | 65 |
| Compression set 100° C./22 hr. (%) | 35.1 | 37.4 | 35.2 | 32.8 | 33.6 | 38.4 | 46.2 |

[a]Added with the other ingredients of the premix before reaction in the mixer.
[b]Added to the mixing chamber after the peroxide was 90 to 95% depleted.

EXAMPLES 1–4

The blends described in Examples 1–4 were prepared by mixing method A described above using a ½lb charge Haake internal mixer. The properties of these blends were compared to those of a thermoplastic elastomer composition (Control 1 A) that did not contain component (B); one in which component (B) was added prior to the crosslinking reaction of the peroxide (Control 2), and one in which more Only those compositions that contained the olefin polymer in an amount within the range claimed and in which the olefin polymer was added after the crosslinking reaction with the peroxide had an R value less than 0.2. When more than the claimed amount of the olefin polymer was added (Control 3), there was a significant increase in the compression set of the blend relative to the control. As indicated by the high compression set value, the elastic properties of the final composition were reduced.

EXAMPLES 5–7

These examples show the preparation of the blends of this invention using mixing methods B and C described previously. The amounts of each component of the blends and the R values of the die deposits are shown in Table 2.

Control 1B, which was the thermoplastic elastomer plus the curing system and other additives, was the same as Control 1A (Table 1), except that it was prepared using a 130 lb Banbury mixer and pelletized with a 2½ inch extruder. The olefin polymer used as component (B) was the same as the one used in Examples 1–4.

Comparable R values were obtained using mixing methods B and C. The R value of the control was 1.0 (see Table 1).

TABLE 2

|  | Example 5 | Example 6 | Example 7 |
|---|---|---|---|
| Control 1B (parts) | 100 | 100 | 100 |
| Olefin polymer 1A (parts) | 5 | 5 | 2.5 |
| Mix method | B | C | C |
| Die deposits (g) | 0.0029 | 0.0028 | 0.0034 |
| R value | 0.12 | 0.12 | 0.15 |

EXAMPLES 8–11

These examples show the preparation of blends of this invention using mixing method C described previously, and various olefin polymers as component (B). The amounts of each component of the blends and the R values for the die deposits are shown in Table 3.

Control 1B is described in Examples 5–7. Olefin polymer 1B is a reactor blend of 35% propylene homopolymer, 5% semicrystalline ethylene/propylene copolymer containing 10% propylene, and 60% ethylene/propylene rubber containing 30% ethylene and 70% propylene. The ethylene/propylene copolymer was Dutral CO-038FF ethylene/propylene copolymer supplied by Enichem America, Inc., which contained 70% ethylene and 30% propylene and had a Mooney viscosity (ML(1+4)) at 121° C. of 65, a density of 0.865 g/cm$^3$, and a degree of crystallinity of about 1 to 2%. The butylene homopolymer had a melt index of 20 dg/min and a density of 0.915 g/cm$^3$.

The R values for blends containing the three types of olefin polymers were all below 0.2. An R value below 0.2 is considered to be a substantial improvement over deposits collected for compositions that do not contain component (B). The R value of the control was 1.0 (see Table 1).

TABLE 3

|  | Example 8 | Example 9 | Example 10 | Example 11 |
|---|---|---|---|---|
| Control 1B (parts) | 100 | 100 | 100 | 100 |
| Olefin polymer 1B (parts) | 5 | — | — | — |
| Polybutylene (parts) | — | — | — | 5.0 |
| Ethylene/propylene copolymer (parts) | — | 2.5 | 5.0 | — |
| Mix method | C | C | C | C |
| Die deposits (g) | 0.0023 | 0.0044 | 0.0028 | 0.003 |
| R value | 0.1 | 0.19 | 0.12 | 0.19 |

EXAMPLE 12

This example shows the preparation of a blend of an olefin polymer and a different thermoplastic elastomer than the one used in the previous examples, using mixing method B as described previously. The amounts of each component of the blend, the R values for the die deposits, and the physical properties of the molded plaques compared to a control containing no olefin polymer component are shown in Table 4.

The thermoplastic elastomer contained 48.4% crystalline propylene homopolymer, 32.23% amorphous ethylene/propylene copolymer, 16.14% semicrystalline ethylene/propylene copolymer, and 3.22% polybutylene. The thermoplastic elastomer was a blend of (a) 62.62 parts of a reactor blend of 40% crystalline propylene homopolymer, 20% semicrystalline copolymer of ethylene and propylene containing 10% propylene, and 40% amorphous copolymer of 50% ethylene and 50% propylene; (b) 12.5 parts of a propylene homopolymer with a melt flow of 4 dg/min; and (c) 2.5 parts of a butylene homopolymer having a melt index of 20 dg/min and a density of 0.915 g/cm$^3$.

Olefin polymer 1B was described in Examples 8–11.

TABLE 4

| Ingredients | Example 12 | Control 4 |
|---|---|---|
| Thermoplastic elastomer | 77.62 | 77.62 |
| Olefin polymer 1B | 10 | — |
| 4,4'-Thio-bis-(6-tert-butyl-m-cresol) | 0.19 | 0.19 |
| Zinc Oxide | 3.76 | 3.76 |
| Polybutadiene | 2.50 | 2.50 |
| 1,1'-Bis(tert-butylperoxy)diisopropylbenzene | 2.63 | 2.63 |
| Polymeric amylphenol disulfide | 0.38 | 0.38 |
| Paraffinic oil | 7.51 | 7.51 |
| Zinc-2-mercaptobenzothiazole | 1.57 | 1.57 |
| Mix method | B | Premix |
| Die deposits (g) | 0.0006 | 0.0128 |
| R value | 0.05 | 1 |
| 100% Modulus (psi) | 1405 | 1420 |
| Tensile strength (psi) | 2215 | 2230 |
| Elongation (%) | 443 | 432 |
| Shore A hardness | 41 | 42 |
| Compression set 100° C./22 hr. (%) | 63.8 | 62.4 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:

1. A composition comprising a blend of
   (A) about 97.5% to about 85% by weight, based on the total weight of the blend, of a dynamically partially crosslinked thermoplastic elastomer prepared from a composition comprising
   (1) about 30% to about 70% of a crystalline propylene homopolymer having an isotactic index greater than 90%, or a crystalline propylene copolymer with ethylene or a 4–8 carbon alpha-olefin having a propylene content greater than 85% and an isotactic index greater than 85%;
   (2) about 30% to about 60% of an amorphous rubber fraction comprising an ethylene/propylene or ethylene/butylene copolymer and, optionally, about 1% to about 10% of a diene, based on the total weight of ethylene/propylene or ethylene/butylene copolymer, wherein the rubber is xylene soluble at room temperature and contains about 30% to about 70% ethylene, and about 70% to about 30% propylene or butylene, based on the total weight of ethylene/propylene or ethylene/butylene copolymer;

(3) about 3% to about 30% of a semicrystalline ethylene/propylene or ethylene/butylene copolymer that is xylene insoluble at room temperature and contains greater than 90% ethylene, all percentages being by weight, based on the total weight of (1)+(2)+(3), and (4) 0 to about 20 parts, based on 100 parts of (1)+(2)+(3), of a crystalline butene-1 homopolymer, wherein the ratio of polybutene-1 to rubber is less than 0.5 and, (B) about 2.5% to about 15% by weight, based on the total weight of the blend, of an uncrosslinked olefin polymer material selected from the group consisting of (1) a heterophasic olefin polymer composition prepared by polymerization in at least two stages comprising (a) about 10% to about 50% of a propylene homopolymer having an isotactic index greater than 80, or a propylene copolymer selected from the group consisting of (i) propylene and ethylene, (ii) propylene, ethylene and a $CH_2$=CHR alpha-olefin, where R is a 2–8 carbon straight or branched alkyl, and (iii) propylene and an alpha-olefin as defined in (ii), the copolymer containing over 80% propylene and having an isotactic index greater than 80, (b) about 5% to about 20% of a semicrystalline, essentially linear ethylene copolymer fraction having a crystallinity of about 20% to about 60%, wherein the copolymer is selected from the group consisting of (i) ethylene and propylene containing over 55% ethylene, (ii) ethylene, propylene, and an alpha-olefin as defined in (a)(ii) containing about 1% to about 10% of the alpha-olefin and over 55% of both ethylene and alpha-olefin, and (iii) ethylene and an alpha-olefin as defined in (a)(ii) containing over 55% of the alpha-olefin, which copolymer is insoluble in xylene at room or ambient temperature, and (c) about 40% to about 80% of an ethylene copolymer fraction wherein the copolymer is selected from the group consisting of (i) ethylene and propylene containing from 20% to less than 40% ethylene, (ii) ethylene, propylene, and an alpha-olefin as defined in (a)(ii), wherein the alpha-olefin is present in an amount of about 1% to about 10% and the amount of ethylene and alpha-olefin present is from 20% to less than 40%, and (iii) ethylene and an alpha-olefin as defined in (a)(ii) containing from 20% to less than 40% of the alpha-olefin, and optionally about 0.5% to about 10% of a diene, the copolymer fraction being soluble in xylene at ambient temperature, and having an intrinsic viscosity of about 1.5 to about 4.0 dl/g, the total of the (b) and (c) fractions, based on the total heterophasic olefin polymer composition, being about 50% to about 90%, and the weight ratio of (b)/(c) being less than 0.4, wherein the composition has a flexural modulus of less than 150 MPa, (2) a crystalline butene-1 homopolymer, and (3) a substantially amorphous ethylene/propylene or ethylene/butylene copolymer having an ethylene content of about 70% to about 80% and a propylene or butylene content of about 30% to about 20%; or a substantially amorphous terpolymer of (a) ethylene, (b) propylene or butylene, and (c) a nonconjugated diene, the ethylene content being about 70% to about 80%, the propylene or butylene content being about 30% to about 20%, and the diene content being about 1% to about 10%, based on the total weight of ethylene plus propylene or butylene.

2. The composition of claim 1, wherein A(1) is a propylene homopolymer.

3. The composition of claim 1, wherein A(2) is an ethylene/propylene copolymer rubber.

4. The composition of claim 1, wherein A(3) is a semicrystalline ethylene/propylene copolymer.

5. The composition of claim 1, wherein A(4) is present in an amount of about 2 to about 20 parts of polybutene-1, based on 100 parts of (1)+(2)+(3).

6. The composition of claim 1, wherein B is a heterophasic olefin polymer composition comprising a crystalline ethylene/propylene copolymer, a semicrystalline ethylene/propylene copolymer, and an ethylene/propylene copolymer rubber.

7. The composition of claim 1, wherein B is a heterophasic olefin polymer composition comprising a crystalline propylene homopolymer, a semicrystalline ethylene/propylene copolymer, and an ethylene/propylene copolymer rubber.

8. The composition of claim 1, wherein (A) is present in an amount of about 95% to about 90%, based on the total weight of the blend.

9. The composition of claim 1, wherein (B) is present in an amount of about 5% to about 10%, based on the total weight of the blend.

* * * * *